(12) United States Patent
Thiel et al.

(10) Patent No.: US 9,422,924 B2
(45) Date of Patent: Aug. 23, 2016

(54) NACELLE COVER

(75) Inventors: Enrico Thiel, Rostock (DE); Thorsten Klook, Rostock (DE); Stefan Heuer, Rostock (DE); Deepak Anand, Berlin (DE)

(73) Assignee: SUZLON ENERGY GMBH, Rostock (DE)

( * ) Notice: Subject to any disclaimer, the term of this patent is extended or adjusted under 35 U.S.C. 154(b) by 879 days.

(21) Appl. No.: 13/806,006

(22) PCT Filed: Jun. 29, 2011

(86) PCT No.: PCT/EP2011/060963
§ 371 (c)(1),
(2), (4) Date: Jan. 18, 2013

(87) PCT Pub. No.: WO2012/001081
PCT Pub. Date: Jan. 5, 2012

(65) Prior Publication Data
US 2013/0115073 A1 May 9, 2013

(30) Foreign Application Priority Data
Jun. 29, 2010 (DE) .................... 10 2010 025 546

(51) Int. Cl.
*F03D 11/00* (2006.01)
*F03D 11/04* (2006.01)

(52) U.S. Cl.
CPC .............. *F03D 11/04* (2013.01); *F03D 11/00* (2013.01); *F03D 11/0033* (2013.01); *F03D 11/0066* (2013.01); *F05B 2240/14* (2013.01); *F05B 2280/6003* (2013.01); *Y02E 10/722* (2013.01)

(58) Field of Classification Search
CPC .......................... Y02E 10/722; F05B 2240/14
See application file for complete search history.

(56) References Cited

U.S. PATENT DOCUMENTS

| 4,502,092 A | * | 2/1985 | Bannink, Jr. | ........... B64D 45/02 244/1 A |
| 4,920,449 A | * | 4/1990 | Covey | ....................... H05F 3/02 244/1 A |

(Continued)

FOREIGN PATENT DOCUMENTS

| CN | 101080570 A | 11/2007 |
| CN | 101490412 A | 5/2009 |

(Continued)

OTHER PUBLICATIONS

International Search Report dated Feb. 14, 2012, mailed Feb. 21, 2012.

(Continued)

*Primary Examiner* — Igor Kershteyn
*Assistant Examiner* — Christopher R Legendre
(74) *Attorney, Agent, or Firm* — Norris McLaughlin & Marcus PA

(57) ABSTRACT

For a wind turbine, an electromagnetically shielding nacelle cover is formed of a composite material which can comprise, for example, an outer layer made of a fiber material or fiber mats such as glass fiber mats and an interposed foam layer. A conductor layer, for example a mesh, a woven fabric or a coating made of conductive material is integrated between the fiber layers of the composite material to provide electromagnetic shielding of the nacelle. The conductor layer is also connected, or can be connected, directly or indirectly, to at least one conductive structure that is applied to the outside of the nacelle cover.

3 Claims, 10 Drawing Sheets

(56) References Cited

U.S. PATENT DOCUMENTS

| | | | |
|---|---|---|---|
| 7,494,324 B2* | 2/2009 | Hibbard | F03D 11/00 416/226 |
| 7,651,320 B2* | 1/2010 | Hansen | F03D 11/0033 416/1 |
| 7,837,443 B2* | 11/2010 | Mikkelsen | F03D 11/00 361/220 |
| 8,118,559 B2 | 2/2012 | Llorente Gonzalez et al. | |
| 8,182,227 B2* | 5/2012 | Jacobsen | F03D 1/0675 416/146 R |
| 8,393,068 B2* | 3/2013 | Keener | F16B 19/06 29/525.01 |
| 8,675,335 B2* | 3/2014 | Wilson | B29C 70/443 361/218 |
| 9,022,745 B2* | 5/2015 | Shimono | B29C 70/342 416/244 R |
| 9,097,238 B2* | 8/2015 | Lewke | F03D 11/0033 |
| 2009/0121491 A1 | 5/2009 | Mikkelsen | |
| 2009/0196751 A1 | 8/2009 | Jacobsen et al. | |
| 2012/0282097 A1* | 11/2012 | Lewke | F03D 11/00 416/146 R |
| 2013/0115073 A1* | 5/2013 | Thiel | F03D 11/00 415/208.1 |

FOREIGN PATENT DOCUMENTS

| | | | |
|---|---|---|---|
| CN | 101463802 A | 6/2009 | |
| CN | 101588059 A | 11/2009 | |
| CN | 201401288 Y | 2/2010 | |
| DE | 10 2009 003405 A1 | 8/2009 | |
| DK | WO 2011057828 A1 * | 5/2011 | .......... F03D 11/0033 |
| EP | 1 830 063 A1 | 9/2007 | |
| FR | 2 783 196 A1 | 3/2000 | |
| WO | 2005/050808 A1 | 6/2005 | |
| WO | 2008/006377 A1 | 1/2008 | |
| WO | 2010/037991 A1 | 4/2010 | |

OTHER PUBLICATIONS

Translation of International Search Report dated Feb. 14, 2012, mailed Feb. 21, 2012.
Office Action dated Jun. 6, 2011 issued by the German Patent Office.
Chinese Office Action dated Dec. 10, 2014.

* cited by examiner

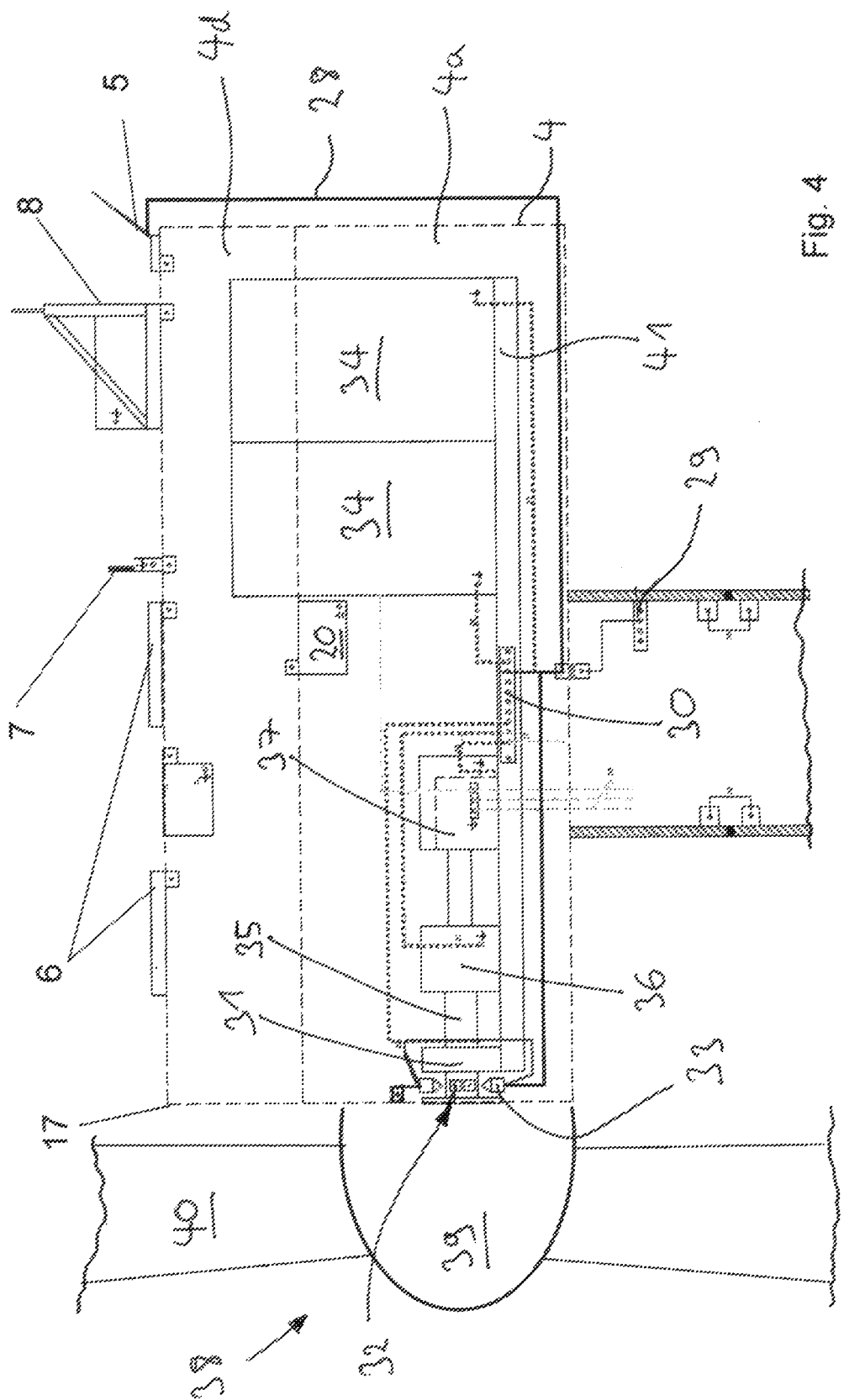

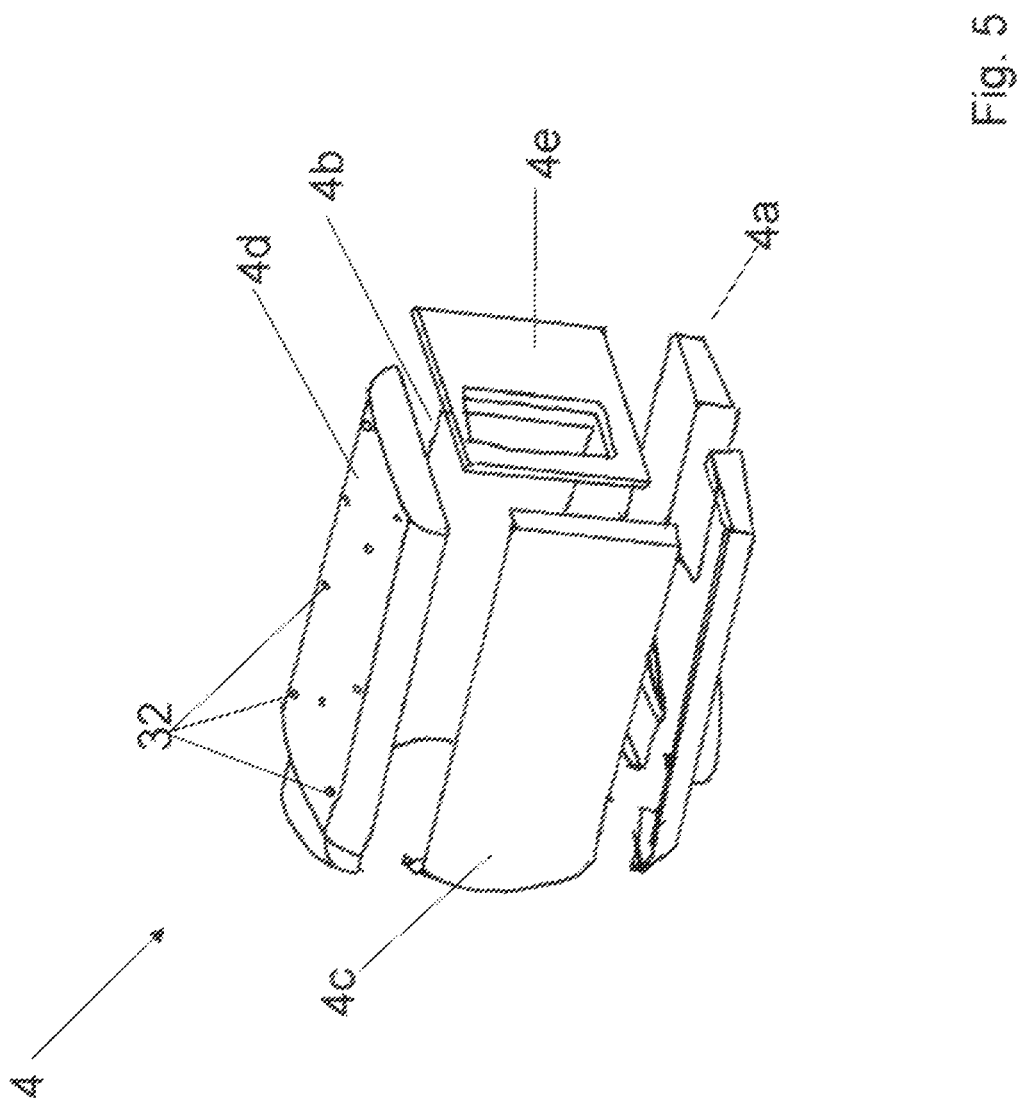

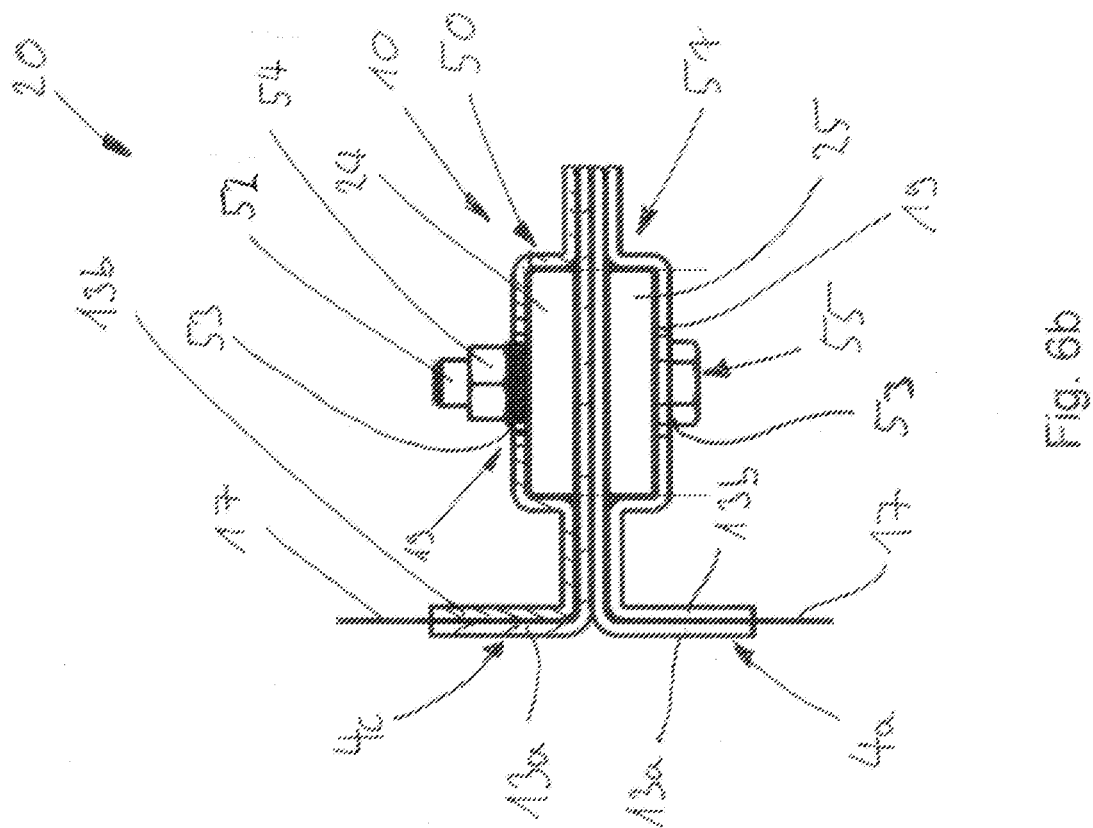
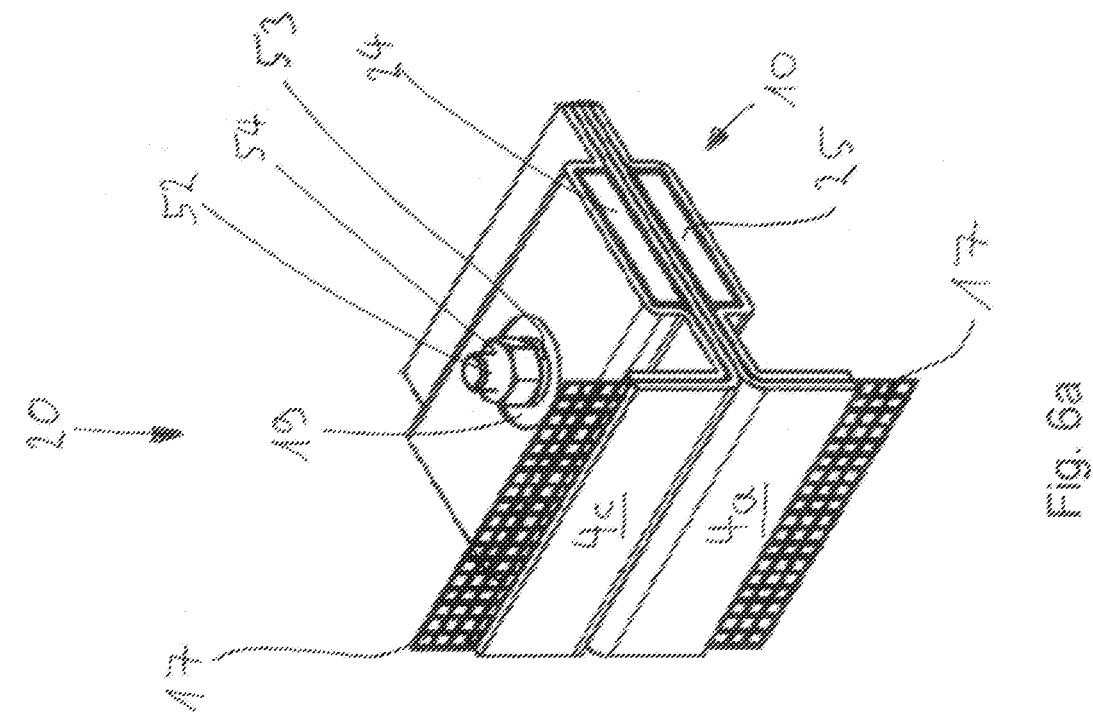

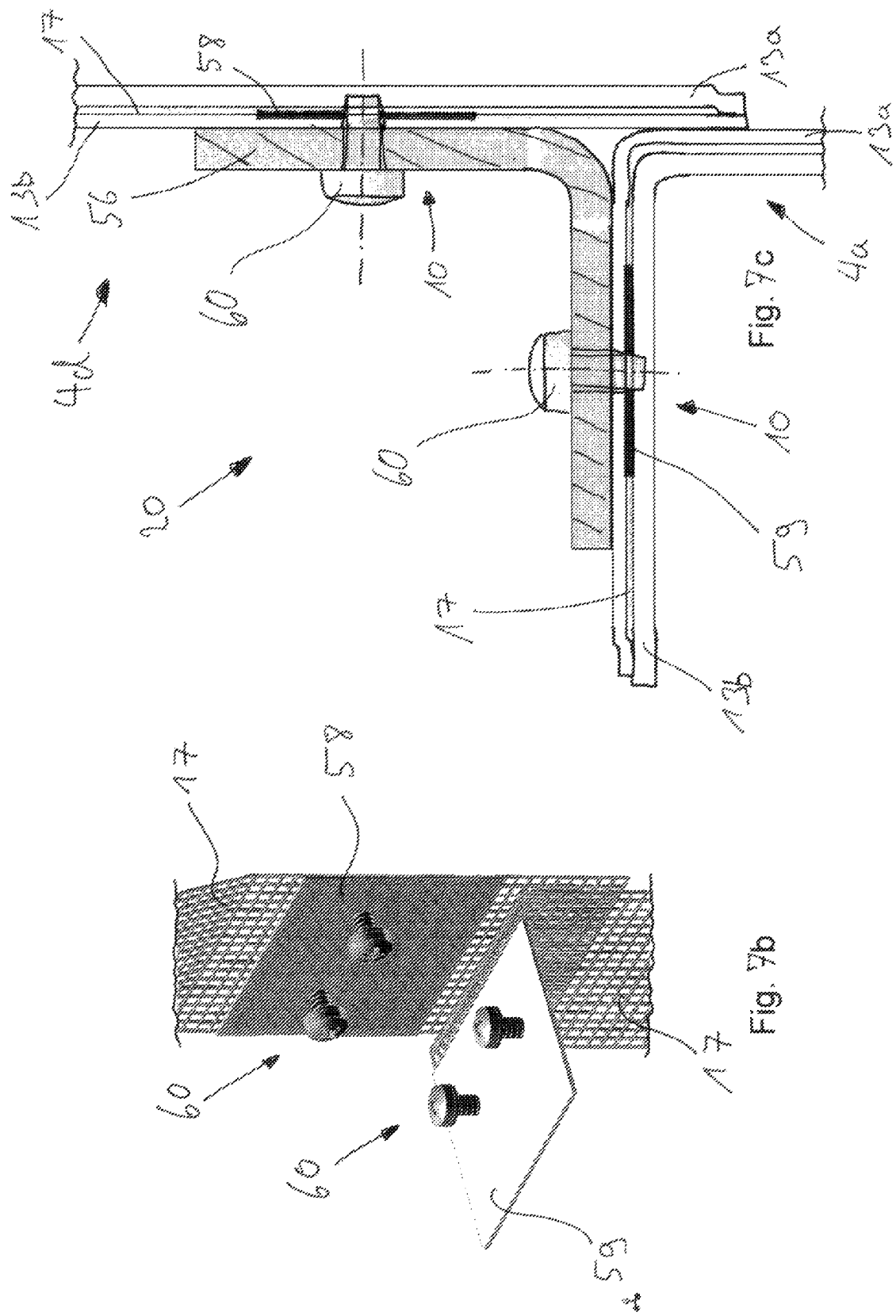

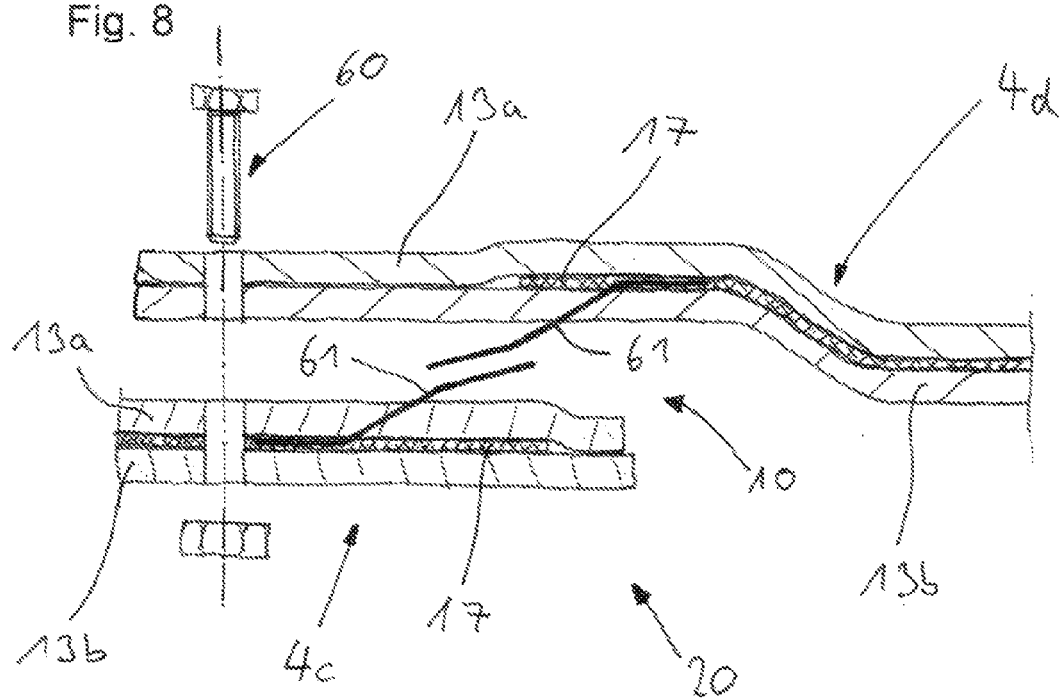
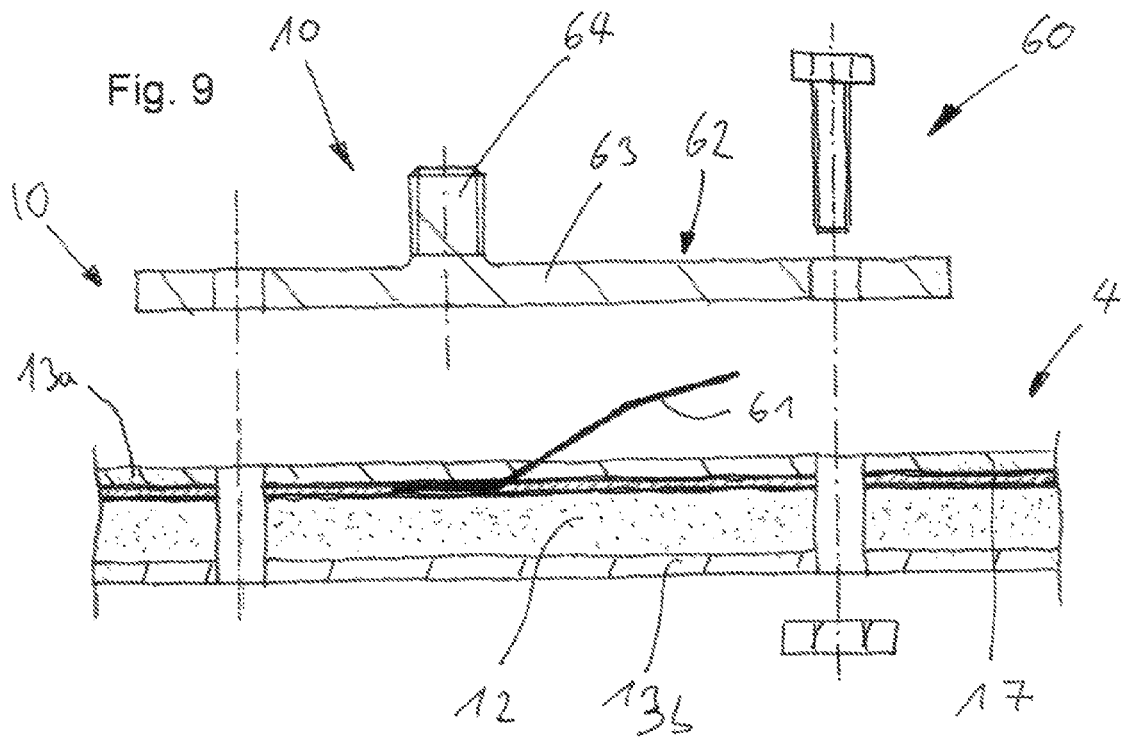

NACELLE COVER

This application is a 371 application of PCT/EP2011/060963 Jun. 29, 2011, which claims foreign priority benefit under 35 U.S.C. §119 of German applications 10 2010 025 546.7 filed Jun. 29, 2010.

TECHNICAL FIELD

The invention relates to a wind turbine with an electromagnetically shielding nacelle cover, to a nacelle cover with electromagnetically shielding effect, to an element for a nacelle cover that is composed of a plurality of elements, and to a method for producing such an element for a nacelle cover of a wind turbine.

BACKGROUND

To reduce the field-related interferences induced by radio systems, lightning discharges and other disturbing sources on the electrical and electronic systems in nacelles, an electromagnetic shielding is necessary. On one hand this is to ensure that the sensitive technology of the included switchgears is not disturbed, on the other hand, it serves to prevent personal injuries resulting from possibly occurring leakage currents or electrical discharges.

An important application field of such measures is nacelles of wind turbines, since sensitive technological systems are accommodated in a narrowest space which is accessible for maintenance personnel. Shielding is also necessary for implementing a lightning protection zone 1 within the nacelle according to the lightning protection zone concept described in the standards of the International Electro-technical Commission, IEC 62305 and required in the IEC 61400-24 for wind turbines.

For electromagnetic shielding in the nacelle of a wind turbine, various methods are known in the prior art: One possibility is to manufacture the nacelle completely from metal. However, this is undesirable in nacelles of large wind turbines due to the heavy weights and high material costs.

If the nacelle is made of composite material according to the prior art, a further possibility is to apply a metal foil on the inner or outer side of the nacelle cover or provide the nacelle cover with a lacquer coating with shielding characteristics.

A further possibility in most cases is to apply shielding mats on the inner side of a nacelle cover. An electrically conductive conductor layer configured as lattice mesh, which is integrated into the nacelle cover to provide shielding effect, is known from CA002657037A1.

Besides the electromagnetic shielding of the interior region of nacelles of wind turbines, it is prescribed according to the standard IEC 60364-5-54 that conductive structures, which are installed on the outside of nacelles, such as handrails, safety hooks, ladders or metal retaining systems for attachments, are equipped with means for potential equalization. These conductive structures must be connected to the potential equalization equipment of the machine support and the electrical equipment of the wind turbine. Because in this way it is prevented that a voltage equalization between electrically charged components and non-charged or components connected to the ground occurs via a person—for example, a maintenance person in the nacelle. The aim is to avoid dangerous contact voltages between two conductive parts in the hand area of 2.5 m.

This is usually realized by means of separate wires/cables, which are laid or mounted on the inside of the nacelle cover and more specifically on the walls and the roof. However, in addition to a growing complexity of the electrical equipment, this causes a potential risk, as a danger of stumbling or getting stuck occurs for the maintenance person in the case of improper fixation of wires and cables.

This complexity is additionally increased by the installation of cables of the lightning diversion device. The lightning current diversion occurs from the lightning rods on the roof of the nacelle cover of the wind turbine and is diverted to the earth by means of separately arranged diverting means, such as cables, wires and/or round wire. Mostly, these diverting means are led through the interior of the nacelle, which may have severe consequences for the systems in the nacelle in the case of the lightning diversion: Firstly, a lightning diversion through the interior of nacelles can result in an electrical flashover of the lightning diversion to an adjacent structural member, to electrical switchgears, cables and wires. Secondly, it can cause a radiation of an electromagnetic field in the case of diversion of high lightning currents, which induces currents and voltages in other conductor loops and conductive structures.

These currents (induced lightning current) and voltage (overvoltage) may endanger or destroy electrical equipment and electronic systems. The field components are not reduced in their field strength through the locally concentrated radiation of the field of the lightning conductor, and are carried almost unabated.

In the case of an isolated lightning current diversion and lack of connections for potential equalization, a punch-trough of the insulation may occur due to the high voltage drop on the wire. As a result in the isolation may burn up because of the high electric arc temperatures. This isolation fire may then spread to other systems and components, which can result in significant damage or destruction of the entire plant.

In cases of parallel guiding of lightning diverting devices or improper fixation of these conductors, electrodynamic transverse forces on the conductor also become noticeable. As a consequence, this could cause tearing of wires or damage to other systems and components through the moving conductor sections.

In the development, construction and installation of today's wind turbines, the electromagnetic shielding, the potential equalization and the lightning diversion are considered and executed separately.

An object of the present invention is to provide a nacelle cover for a wind turbine, which provides a solution for the aforementioned problems of the prior art.

SUMMARY

This problem is solved by a nacelle cover for a nacelle of a wind turbine according to claim 1. The nacelle cover is made of a composite material, which, for example, may comprise an outer layer made from fiber material or fiber mats, such as glass fiber mats, and intermediate foam layer. A conductor layer, for example, a mesh, a fabric or a coating made from conductive material to provide an electromagnetic shielding of the nacelle is integrated between the fiber layers of the composite material. At the same time, the conductor layer is directly or indirectly connected or connectable with at least one conductive structure mounted on the outer side or inner side of the nacelle cover. Here, according to the present invention, the conductor layer is configured and connected or connectable to the conductive structure or the conductive structures in such a way, that besides an electromagnetic shielding, a lightning current diversion from a conductive structure mounted on the outer side of the nacelle cover and/or a potential equalization between at least two conductive structures mounted on the inner side or the outer side of the nacelle cover is made possible. These conductive structures here may be, for example, handrails, safety hooks, ladders or metal retaining systems for attachments, as well as contact points of adjacent elements of nacelle cover composed of several components.

Accordingly, the wind turbine comprises a nacelle cover, which for the first time has an integrated structure which fulfills in a combined way not only the functions of the electromagnetic shielding, but also the function of the potential equalization between conductive structures on the nacelle cover and/or even the function of the lightning current diversion from the lightning catcher to the earth.

The basis therefore is a metal fabric/metal grid or a metal coating introduced into the composite material, which acts as a shielding material and as a conductor for equalization currents and/or lightning currents. The solution of the task which is to combine the separate functions potential equalization and shielding, and possibly even lightning diversion via a metal fabric/metal grid or metal coating integrated into a composite material, is fulfilled among other things by a conductor element, more specifically by a conductive connection between the conductor layer and the conductive structural elements. Further embodiments and features are disclosed.

According to a preferred embodiment so-called adapters are integrated into the composite material, which enable a conductive connection of the conductor layer to the conductive structures and/or to the lightning catching device. The connection through the adapters and the conductor layer may be dimensioned in such a way that not only the potential equalization via the adapters and the conductor layer, but also a lightning diversion is ensured. For that a sufficiently high cross section of the conductor layer itself and between the conductor layer and the adapter must be provided.

A preferred embodiment discloses that the conductor layer and the conductor element are configured to cause an electromagnetic shield of the nacelle and a potential equalization between conductive structures, a lightning diversion however mainly or completely occurs in a lightning conductor which extends separately relative to the conductor layer and is also integrated into the nacelle cover of the nacelle or is disposed thereon. The nacelle cover advantageously comprises an adapter on which the conductor element is arranged in such a way that the adapter with the conductor layer has an electrically conductive connecting cross-section, which meets the requirements of IEC 60364-5-54.

The adapter may include a connection element for connecting conductive structures and an adapter plate configured as the conductive element, which respectively are made of conductive material. The connection element, for example a threaded bolt, is electrically conductively connected with the adapter plate and the adapter plate is electrically conductively connected with the conductor layer. The adapter plate is disposed between the layers of the nacelle cover. Here, the adapter plate is preferably electrically conductively connected with the net/metal grid or the metal coating of the nacelle cover by means of electrically conductive adhesive or anything else. In the assembled state conductive structures mounted on the outer side of the nacelle cover, such as hand rails, safety hooks, ladders or metallic support systems for attachments, are electrically conductively connected with the bolts of the adapter.

Particularly preferably each of the contact surfaces between the conductive structure and bolts, between the bolt and the adapter plate as well as between the adapter plate and metal fabric/metal grid or metal coating, has a cross-sectional area which meet the requirements of the standard IEC 61400-24 (lightning protection) and/or IEC 60364-5-54 (protective potential equalization conductors).

According to an alternative form of the conductor elements, the conductor element is configured as an adapter which is at least partially disposed between the outer layer and inner layer of the composite material of the nacelle cover, wherein it projects through the outer layer or the inner layer of the nacelle cover. More preferably, the adapter is configured as a spring contact which protrudes from the nacelle cover. Particularly preferably, such spring contacts can be made of leaf springs which are connected to the conductor layer and project through the layers of the composite material outwards on an outer surface or also inwards on an inner surface. Such spring contacts are particularly easy to bring in during the manufacture of the composite material and manufacture in accordance with the desired effect. One aspect independent of the above invention is that a conductor layer configured as a metal net, a metal grid, a metal fabric or a metal coating is integrated in each of these sub-elements of the nacelle cover, wherein each of these sub-elements has at least one connection-interface, through which the conductor layer of the respective sub-element is electrically conductively connected with an, in an assembled state, adjacent sub-element of the nacelle cover. These connection points can also be used at the same time to connect and assemble the elements mechanically.

Preferably, the connection interfaces between two sub-elements thereby have a cross-sectional area that meets the requirements of the standard IEC 60364-5-54, so that a potential equalization between the conductive structures mounted on the two sub-elements can be achieved via the net, the fabric or the coating of the two sub-elements and the connection interface(s). In the case that the integrated conductor layer should also be used for diverting lightning currents, the electrical cross-sectional area should satisfy the standard IEC 61400-24.

According to a preferred embodiment, the connection interfaces are formed by spring contacts and contact surfaces. Such spring contacts are formed particularly preferably by leaf springs.

According to a further embodiment of the invention, in addition to the potential equalization the lightning current diversion is also realized through a conductive structure integrated into the nacelle cover. According to an aspect, means for lightning current diversion is integrated into the net, the fabric or the coating which serves for potential equalization and electromagnetic shielding. This can preferably be realized by designing an enlarged cross-section along a section of the net, which reaches from a conductive lightning rod for lightning diversion mounted on the outer side of the nacelle cover to the earth connecting device of the wind turbine so that most of the lightning current diversion is achieved through these cross-sections and the whole net/fabric or metal coating would not be damaged by the lightning diversion. The conductive cross-sectional area should satisfy the standard IEC 61400-24.

According to an alternative additional embodiment of the invention, the lightning current diversion and the potential equalization are performed separately and galvanically separated to each other. Preferably the lightning current diverting device is integrated into the nacelle cover in form of a conductor but is isolated from the net, the fabric or the coating, which is used for potential equalization and electromagnetic shielding. In this case the conductor of the lightning current diverting device is integrated further outside in the nacelle cover than the conductor layer, in respect to the interior of the nacelle.

Preferably, the conductor layer and/or the separate lightning diverting device are electrically conductively connected with the potential equalization system of the machine support via connection interfaces.

All conductive structures in the nacelle, such as the metallic housing of the generator and the transmission and the electrical equipment, are connected to the potential equalization system of the machine support. Thus, potential differences between the lightning rod, the lightning current diverting device and other systems and components located in the nacelle can be avoided. This reduces the risk of electrical flashover or punch-throughs passing through the insulation material.

Through the conductive connection of the conductor layer via conductor elements to the conductive structural parts (safety hooks, handrails, ladders, metal retaining systems for attachments) on the nacelle cover and through the connection of the metal fabric/metal grid with the potential equalization system of machine support and electrical equipment, the general requirement on the potential equalization in low-voltage electrical equipments according to IEC 60364 are met. Thus, the function of electrical protective devices is assured in case of failure (e.g. blowing a fuse of a faulty electrical circuit with earth contact, earth fault).

Through the said invention, separate wires for potential equalization and for lightning current diversion are omitted. The system technology within a nacelle is made much clearer and risk-free. Through the complete embedding of the metal fabric/metal grid or the metal coating of the potential equalization wires and of the lightning diverting devices into the composite material, these are not exposed to the weather conditions (humidity, moisture due to condensation when the temperature changes). This reduces the risk of corrosion of the wires and the metal fabric. Compared to conventional systems, this increases the ease of maintenance and increases the lifetime of this system. By using one single material for multiple applications additional costs can be saved.

Compared to the conventional separate implementations of electromagnetic shielding, potential equalization and possibly even lightning current diversion, a combination of these implementations is achieved in the invention. The physical effects can be positively made use of under efficient use of materials, in order to protect the mechanical, electrical and electronic systems within the nacelle (increasing equipment availability). Due to the compact and modular design the installation time can be significantly reduced, which saves costs in the production, manufacture and installation. Furthermore, the installation is facilitated by the predefined fixing and connection points. This also reduces the number of necessary equipment or tools on building sites. By greatly simplifying installation and reducing installation steps, the risk of accidents during the installation is also reduced. Another positive effect is the implementation of a lightning protection zone 1 (according to the lightning protection zone concept according to IEC 62305) inside the nacelle. Thereby other costs in the internal lightning protection system, such as over-voltage protectors, metallic cable trays and cable shielding can be saved, which in turn results in a cost optimization.

One significant feature of modern injection procedure (e.g. through vacuum injection) for composite materials is the on all sides hermetically sealed mold for the composite components, which include inlets and outlets (filling and suction nozzle) for the filling material (injection resin/casting resin). These molds are part of a pump cycle, which the injection resin passes through and is thus distributed in the mold. Through the closure of the mold on all sides a protrusion of conductive connections is hard to realize. Especially difficult is the protrusion of the conductive connection from the adapter or the connection interfaces which is/are used for the connection of the conductive structures and which is/are connected to the integrated conductor layer in the interior of the mold . . . . In order to realize these multifunctional nacelle covers in an injection process for composite materials, the application of a new production technology is required.

The following method according to the invention is used for this: the filling or evacuating of the injection/casting resin is not carried out via the recyclable filling and suction nozzle for the typical injection method, but via the conductive adapter structures and/or the connecting interfaces.

These adapter structures preferably consist essentially of a threaded bolt with an axial inner bore and an adapter plate mounted (welded or soldered, depending on the material) on the threaded bolt. Through the inner bore, the filling or suction of the injection resin is ensured. The adapter plate is connected with the metal fabric by means of conductive adhesive.

In contrast to the regular process for manufacturing the composite material component filling and/or evacuating is accordingly achieved through devices which are part of the nacelle cover and protrude from the mold. Thus an optimum connection between the manufacturing process and the application itself is created. In this way, conductive connections are led out from the composite material without affecting the manufacturing process substantially. No new machines are needed; accordingly the production process chain will not be significantly affected.

According to a further embodiment, the connection interfaces, which are used for electrical connection of the individual sub-elements of the nacelle cover with each other are used for the injection and/or the evacuation of the resin during the injection process for composite material. Preferably the connection interfaces are also configured accordingly to be hollow profile-shaped and can be used as a "filling and suction nozzle". Accordingly, the manufacturing method and the target application are combined in one process through the use of hollow threaded bolts and/or hollow profile-shaped connection interfaces as filling or suction nozzle.

The alternative embodiment of the adapter as spring contacts proves particularly in the vacuum injection process to be particularly advantageous, since the leaf springs are simply inserted into the molds and between the layers of fibers or the fiber mats and engage hereby through the fiber layers, which form the surfaces to be contacted. Thereby, the conductor element which can be embodied as leaf spring can be arranged prior or after to the insertion of a fiber layer. It is for example also conceivable that the conductor element is fixed to the manufacturing mold and then the fiber layer is brought in by spraying fiber pieces or by inserting fiber mats. Then an opening is made in the fiber layer at the position on which the conductor element is arranged on the manufacturing mold. Through this opening the conductor element can protrude through the layer. During production, the leaf springs are pressed to be flattened by the manufacturing mold so that no large explicit holding fixture for the adapter must be provided in the mold. This greatly reduces the production cost. In order to ensure that the leaf spring is in contact with the surface after finishing the production process, only the upper resin layer, which covers the leaf spring, must be removed. This can for example be done by simple scraping or sanding.

BRIEF DESCRIPTION OF THE DRAWINGS

Further details of the invention will become apparent from the drawings according to the description. In the drawings:

FIG. 4 shows the electrical circuit diagram of the potential equalization of a wind turbine, FIG. 5 shows an exploded view of the nacelle cover composed of several sub-elements, FIG. 6a-d shows a first embodiment of a connection interface, FIG. 7a-c show a second embodiment of a connecting interface, FIG. 8 shows a third embodiment of a connection interface, and FIG. 9 is a cross sectional view of the nacelle cover with a third embodiment of an adapter.

DETAILED DESCRIPTION

Figure 1:
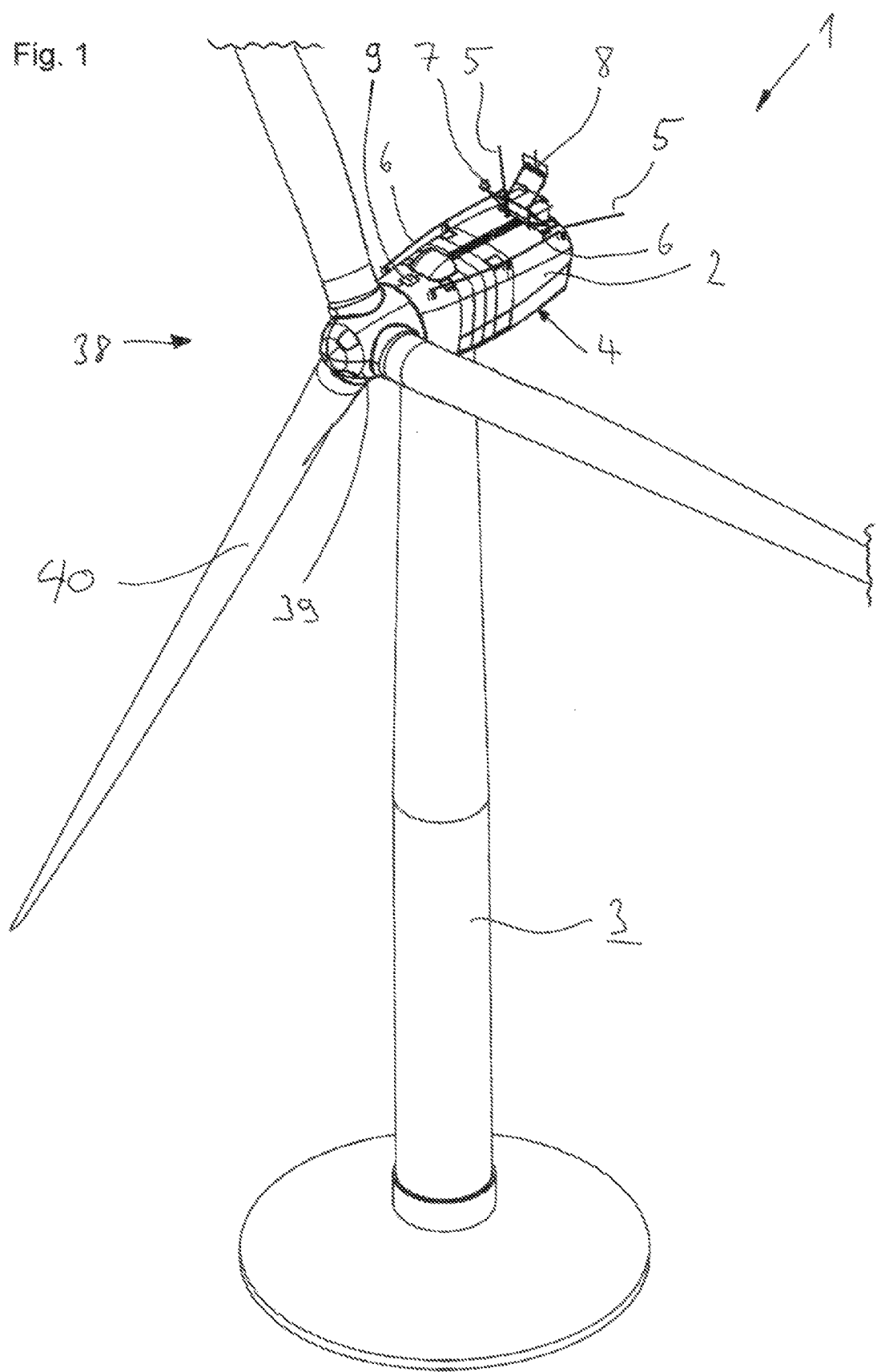
FIG. 1 shows a wind turbine nacelle with nacelle.

In FIG. 1 a wind turbine 1 with a tower 3 and a nacelle 2 rotatably mounted on the tower 3 is shown. In the nacelle 2 a drive train is provided which comprises a rotor shaft 35, which is rotatably mounted on a machine support 34 and connected to a generator 37 via, if necessary, a transmission 36. On the rotor shaft 35 a rotor 38 is arranged, which in turn comprises a hub 39 and at least one rotor blade 40.

A plurality of electrically conductive components such as handrail 6, securing eyelets 65, lightning catcher 5, flight lamp 7, anemometer 8 and exit 9 are mounted on the nacelle 2. To make sure that no personal injuries occurs due to electric potential differences between the individual electrically conductive parts 5, 6, 7, 8, 9, a potential equalization between these components 5, 6, 7, 8, 9 must be ensured. Additionally, the lightning catcher 5 must be connected to the earth connecting device 29, so that the lightning current can be led out in case of lightning. The nacelle cover 4 is made from a composite material, which for example may comprise an outer layer made of resin and fiber or fiber mats 13a, 13b, e.g. glass fiber, and an intermediate layer 12, in particular a foam layer and/or insulation layer 12. A conductor layer 17 which is embodied e.g. as a net 17, is arranged between the fiber layers of the composite material to form a faraday cage.

Figure 2:
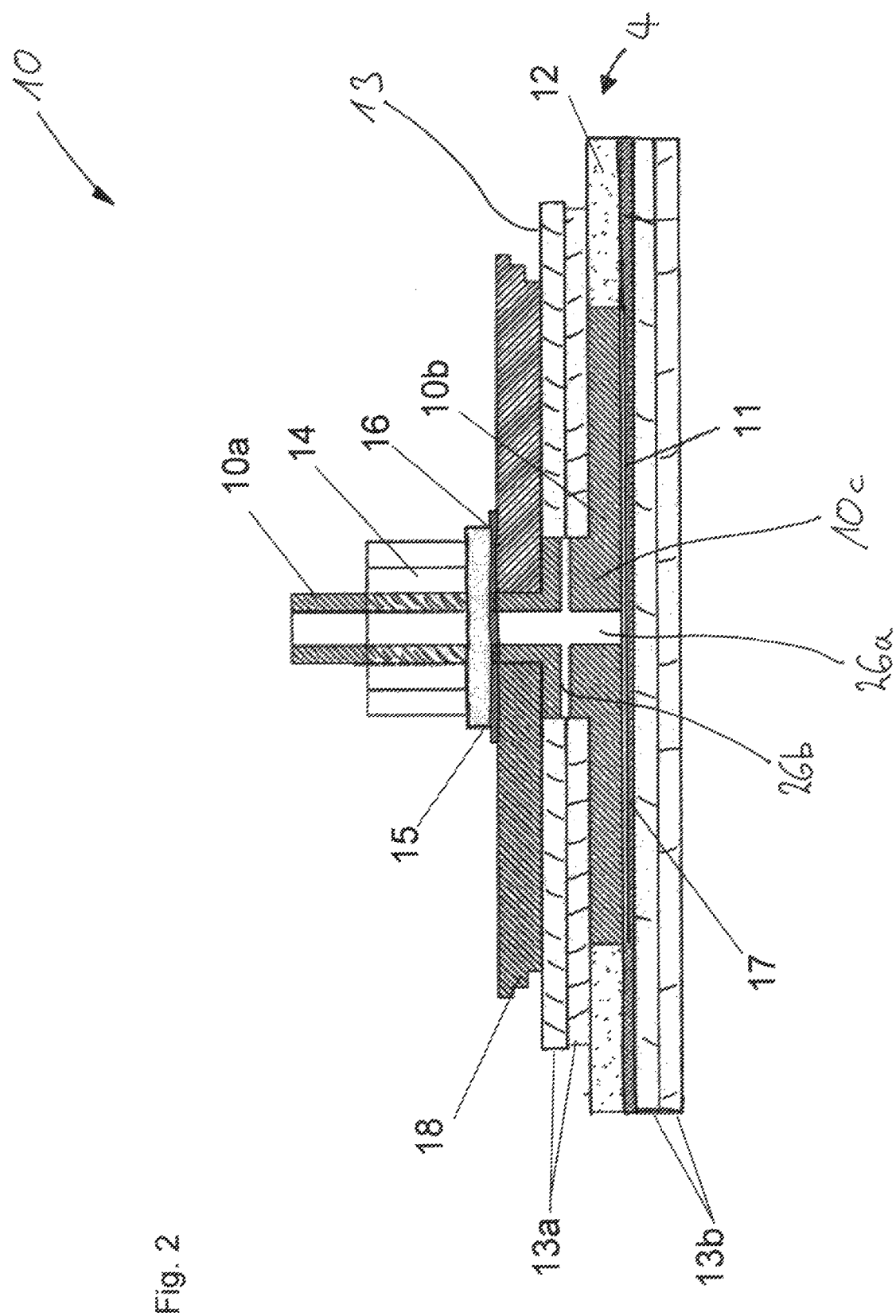
FIG. 2 shows a cross sectional view of the nacelle cover with integrated adapter

In order to connect the top side 13 of the nacelle cover 4, especially the electrically conductive components 5, 6, 7, 8, 9 mounted on the upper nacelle cover element 4d, with the net 17 integrated in the nacelle cover 4, adapters 10 are provided which at least partially incorporate the conductor element. FIG. 2 shows a cross section of a section according to a first embodiment of the nacelle cover 4 with an adapter 10. The adapter 10 comprises a connecting element 10a embodied as a bolt, preferably a threaded bolt, an adapter plate 10b and selectively a transition section 10c connecting the adapter plate 10b and bolts 10a. The components 10a, 10b, 10c of the adapter 10 are preferably formed integrally. The adapter 10 further comprises inner bores 26a, 26b which are used to fill the layers 12, 13a, and 13b with resin. The net 17 is integrated between the outer glass fiber mats 13a, 13b, and is electrically conductively connected with the conductor element formed on the adapter plate 10b, preferably via conductive adhesive 11. It can be seen here that the connecting element 10a configured as threaded bolts of a respective adapter 10 projects out from the surface of the nacelle cover 4 to establish an electrically conductive connection between the net 17 and one of the electrically conductive elements 5, 6, 7, 8, 9. At the positions where no adapter plate 10b is located between the fiber layers 13a, 13b, an insulation mat 12 and/or a foam layer may be provided between the layers 13a, 13b. Thus, the wall thickness of the nacelle cover 4 at a position with adapter 10 is not or barely greater than the wall thickness of the nacelle cover 4 at a position without adapter 10. Of course it is also conceivable that even in the area of the adapter plate 10b, an insulating layer and/or foam layer is provided between the layers 13a, 13b. Alternatively a recess—not shown—can be provided in one or more layers of glass fiber mat 13a and/or 13b, whereby the thickness of the adapter plate 10b is compensated.

During the manufacturing of the nacelle cover 4 in vacuum injection process, a mold cover 18, which forms an airtight mold by means of a threaded nut 14, a washer 15 and a seal 16 together with the lower mold part (not shown here), is mounted on the top side 13 of the upper glass fiber mat 13a. In this way it is possible to use the hollow cylindrical threaded bolt 10a of the adapter 10 as filling and/or suction nozzle for resin of the vacuum mold. Here the fiber layers 13a, 13b are filled with resin through the inner bores 26a, 26b, wherein the inner bores 26a, 26b in the transition section 10c are used to fill the upper fiber layer 13a. After complete hardening of the resin, the nut 14, washer 15 and the seal 16 are removed.

Figure 3:
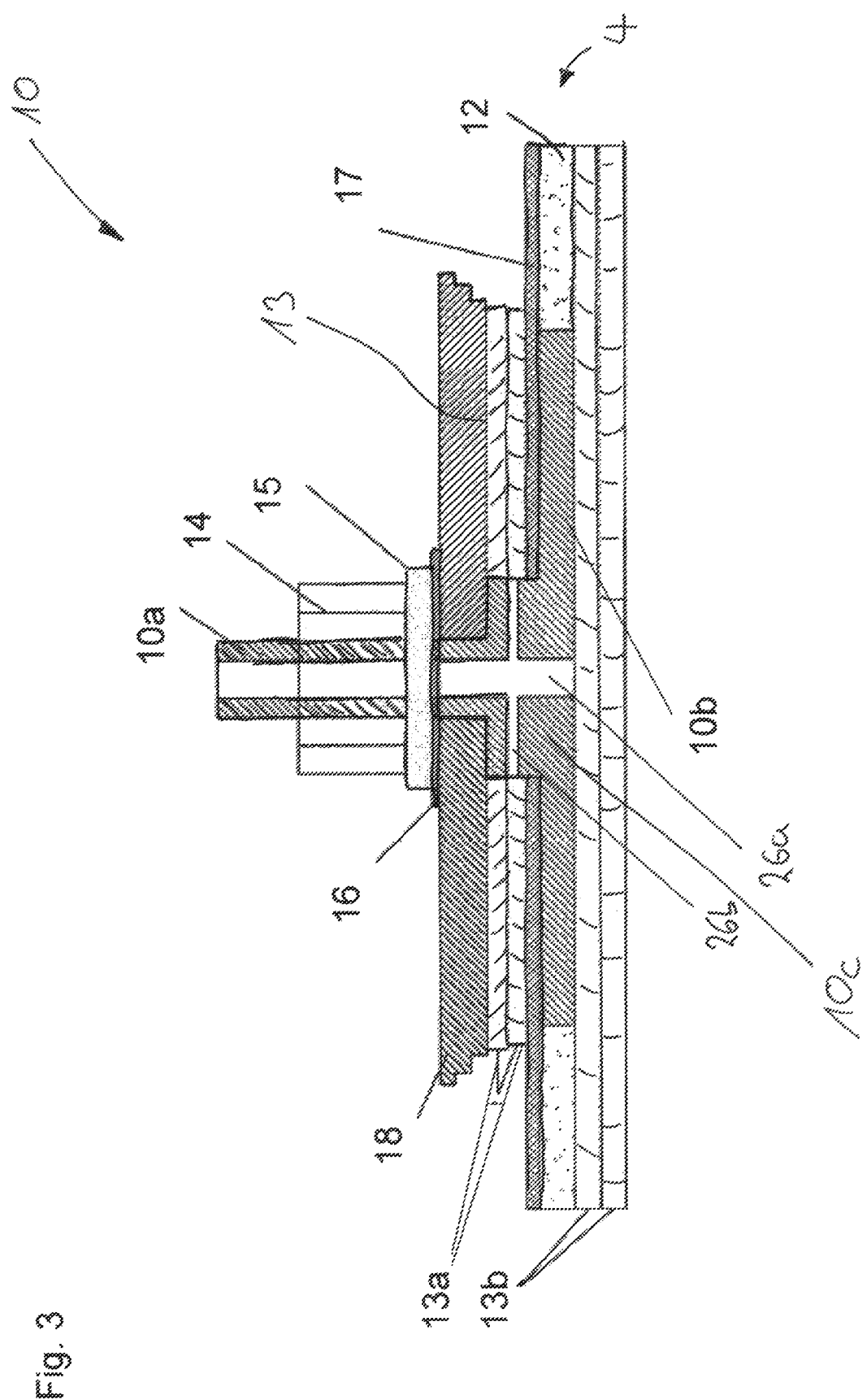
FIG. 3 shows a cross-sectional view of FIG. 2 of a second embodiment of the nacelle cover with integrated adapter.

In FIG. 3 a further embodiment of the structure of the nacelle cover 4 is shown. In contrast to the embodiment according to FIG. 2, here the adapter plate 10b of the adapter 10, which is acting as the conductor element, is arranged below the net 17. Here, the net 17 has a recess through which the adapter 10, preferably the transition section 10c of the adapter 10, protrudes. Optionally the use of a conductive adhesive can be omitted in this case.

In FIG. 5 it shows the nacelle cover 4 of the nacelle 2 composed of several parts. It should be emphasized that the described embodiment of the modular nacelle cover 4 has no limiting effect on the invention. In the case illustrated here, the nacelle cover 4 is composed of at least one lower element 4a, two lateral elements 4b and 4c, an upper element 4d and a rear element 4e. In the individual elements 4a, 4b, 4c, 4d, 4e a conductor layer formed as a net 17 is integrated, which acts as a faraday cage for the interior of the nacelle 2. In order that the net 17 is present everywhere, the nets 17 of the individual elements 4a, 4b, 4c, 4d and 4e of the nacelle cover 4 must be electrically connected to each other and adjacent to each other so that no area is formed which is not covered by the net 17, otherwise the electromagnetic shielding effect would be impaired. Therefore junctions 20 are provided in the elements 4a, 4b, 4c, 4d, and 4e.

In FIGS. 6a to 6d a first embodiment of one of the junctions 20 is shown in a perspective view. With the help of such junctions 20 the individual elements 4a, 4b, 4c, 4d, 4e of the nacelle cover 4 of the nacelle 2 are electrically connected to each other. At the same time this junction 20 can be used as mechanical connecting element for mounting the individual elements 4a, 4b, 4c, 4d, 4e in a contiguous and stable nacelle cover 4. In the section illustrated here the lower element 4a and the lateral element 4c of the nacelle cover 4 are connected with each other.

The net 17 is arranged between the fiber layers 13a, 13b and the edges of the elements 4a, 4c of the nacelle cover 4 are configured as flanges 50, 51 which are bent in direction of the interior space of the nacelle 2 so that they can be connected with each other with the aid of connecting means 55 The connecting means can e.g. be threaded bolts 52, washers 53 and nuts 54. According to the illustrated embodiment, electrically conductive plate-shaped conductor elements 24, 25, preferably metal plates 24, 25, are integrated in the flange-shaped bent edges or flanges 50, 51 of the elements 4a, 4c of the nacelle cover 4. The plate-shaped connector elements 24, 25 are electrically conductively connected respectively to the nets 17 arranged in the element 4a, 4c The conductor elements 24 or 25 in cooperation with the connecting means 55 are considered here as adapters.

Figure 6D:
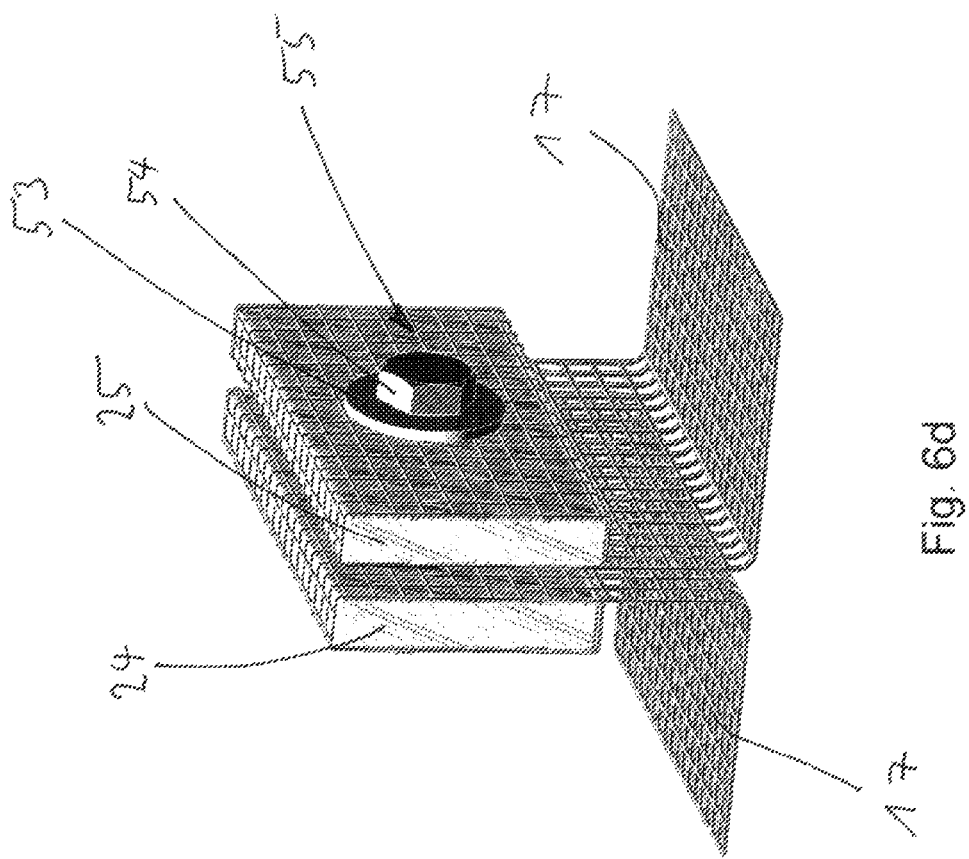
Figure 6C:
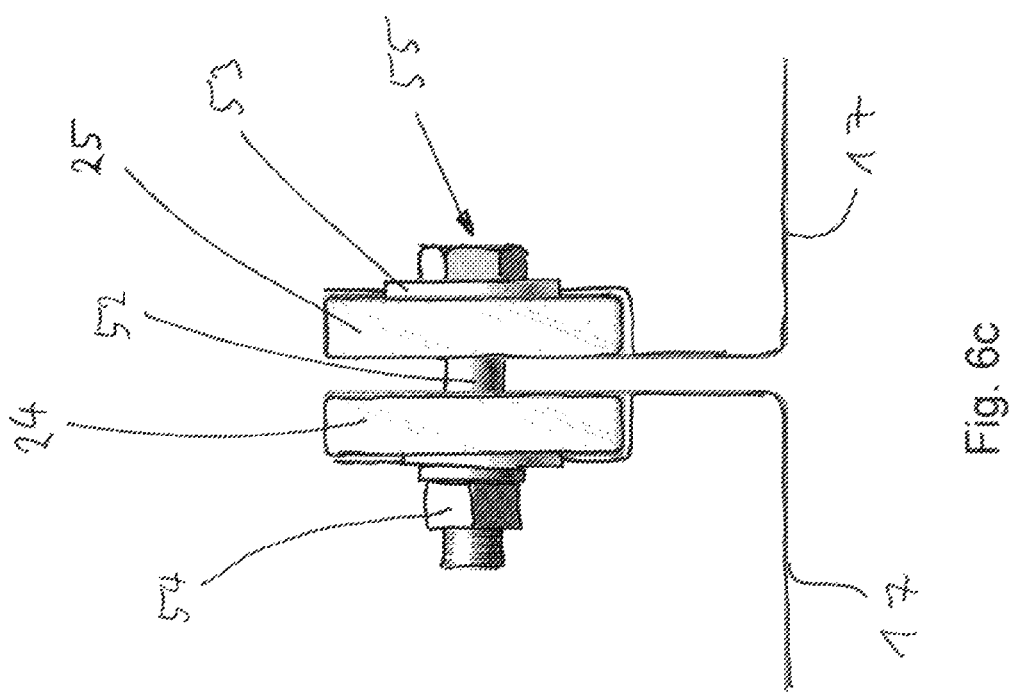

In FIGS. 6c and 6d, the junction 20 is shown without the layers 13a, 13b. It can be seen that the net 17 is arranged around the metal plates 24, 25 respectively. The connecting means 55 are electrically connected with the metal plates 24, 25 so that an electrical connection from the net 17 of the element 4c via the metal plate 24, the washer 53, the threaded bolt 52, the washer 53, and the metal plate 25 to the net 17 of the element 4a is reliably effective. To ensure the electrical contact, a recess 19 for the washers 53 right to the metal plate 24 or 25 may be introduced into the respective layer 13b, for example by milling. Thereby it is possible to achieve a defined electrical connection between the two nets 17 of elements 4a and 4c in the nacelle cover 4 of the nacelle 2, whereby a potential equalization between these nets 17 and therefore a complete shielding and/or lightning current discharge can be achieved. Furthermore, through the geometrical arrangement of the nets 17 in the flanges 50, 51, the net 17 is guided completely and without slots or gaps in the entire nacelle cover 4, whereby the electromagnetic shielding of the interior space of the nacelle 2 is optimized. The completeness of the net 17 around the interior space is very important in this respect, since even small gaps would reduce the shielding effect dramatically, in particular through interference phenomena of slots or openings in faraday cage.

Figure 7A:
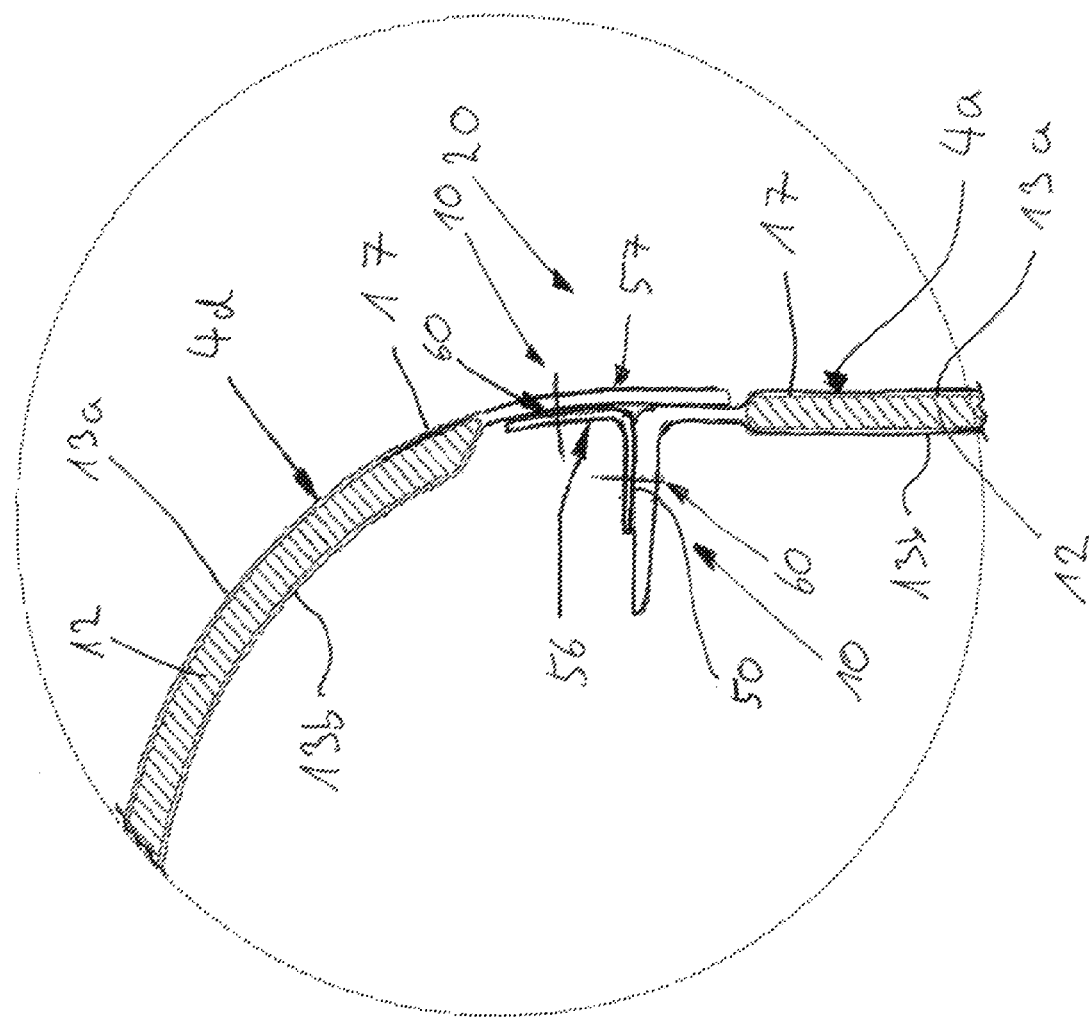

In FIG. 7a-7c, a further embodiment of the junction 20 is shown; here exemplarily a junction 20 between the roof elements 4d and lateral element 4c of the nacelle cover 4 is shown. In this case only the edge of an element 4a is formed inwards as a flange 50, wherein the element 4c is overlapped by the end portion 57 of element 4d. However, this may also be reversed. The geometrical arrangement of the flange 50 and the overlap of the end portion 57 cause the gapless shielding of the interior space of the nacelle 2.

Analogous to the preceding embodiment, plate-shaped conductor elements 58, 59, preferably metal plates 58, 59, which are electrically conductively connected with the nets 17 arranged in respective element 4c, 4d are integrated in the end portion 57 of the element 4d and in the flange 50. The end portion 57 and the flange 50 are mechanically and electrically connected with each other via a carrier 56 and connecting means 60, wherein the connecting means 60 are in turn electrically connected with the metal plates 58, 59. Thus, the electrical connection between the individual elements 4d and 4c is established from the net 17 of elements 4d, via the metal plate 58, the connecting means 60, the carrier 56, the connecting means 60 and via the metal plate 59 to the net 17 of the element 4a. The connecting means 60 can be configured as self-tapping screws.

In FIG. 4 the electrical circuit diagram of the potential equalization and the faraday cage of the nacelle 2 according to a preferred embodiment of the inventive wind turbine 1 is shown. Here it can be seen that components like lightning catcher 5, handrails 6, flight light 7, anemometer 8 and exit 9 are arranged on the nacelle 2. The nacelle cover 4 comprises a net 17, with which the above mentioned components 5, 6, 7, 8 are connected via an adapter 10 according to the invention, and thus a potential equalization between the individual components 5, 6, 7, 8 is made possible. Different elements 4d and 4c of the nacelle cover 4 are connected with each other via the adapter 10 of the junction 20. An earth connection 30 is provided on the machine support 41, with which the earth connecting device of components in the nacelle 2, such as the transmission 36, the main bearing 31, the generator 37, a rotor earth connecting device 32 according to German patent application DE 10 2009 017 824 and switching cabinet 34 are connected. The net 17 of the nacelle cover 4 is also connected to the ground connection 30, wherein the ground connection 30 is in turn connected to the ground 29 of the tower 3 of the wind turbine 1. Thus, the potential equalization of the individual components is guaranteed.

Additionally, the lightning catcher 5 may be connected to the earth connection 30 on the machine support 41 via a lightning arrester 28 and the transmitter 33 for lightning current of the earth connection 32.

FIG. 8 shows a further embodiment of the junction 20 between the end section of two elements 4d and 4c of the nacelle cover 4. Elements 4d and 4c can be fixedly connected to each other with the help of connecting means 60, for example screws. Thereby, an adapter 10 embodied as a leaf spring 61 is arranged in both elements 4d and 4c respectively. The leaf spring 61 is arranged partially between the fiber layers 13a and 13b of the respective element 4d, 4c in direct electrical contact with the net 17. The part of the leaf spring 61 arranged between the layers 13a and 13b is thus regarded as the conductor element according to the invention. The leaf springs 61 project through the layer 13a or 13b of the element 4c or 4d, which is correspondingly associated with the other element 4d or 4c. If the two elements 4c and 4d are connected to each other, then the adapter 10, namely the leaf springs 61 of the junction 20, mutually act upon each other, whereby an electrical contact between the nets 17 of the two elements 4d and 4c is established. A plurality of such junctions 20 can be provided between the elements 4a, 4b, 4b, 4c, and 4d.

FIG. 9 discloses another embodiment of the adapter 10 for connecting of components 5, 6, 7, 8, 9 with the net 17. Here the adapter 10 comprises a leaf spring 61 and a flange 62 comprising an adapter plate 63 and a connecting element 64. Analogous to FIG. 8, part of the leaf spring 61 is arranged between the layers 13a and 13b of the nacelle cover 4 and is thus considered as conductor element which is in direct electrical contact with the net 17. Analogous to FIGS. 2 and 3, the connecting element 64 is used for fixing and/or electrical connection of the components 5, 6, 7, 8, 9 with the flange 62. The flange 62 can be connected via connecting means 60 with the nacelle cover 4, whereby the electrically conductive adapter plate 63 acts upon the leaf spring 61. Therefore the electrical contact between the flange 62 and the leaf spring 61 is also established. The features disclosed in the described embodiments should have no limiting effect on the invention; furthermore the features of the different embodiments can also be combined with each other.

| List of reference signs | | | |
|---|---|---|---|
| 1 | wind turbine | 26a-b | inner bore |
| 2 | nacelle | 28 | lightning arrester |
| 3 | tower | 29 | earth connecting device |
| 4 | nacelle cover | 30 | earth connection |
| 4a-d | element | 31 | main bearing |
| 5 | lightning catcher | 32 | rotor earth connecting device |
| 6 | handrail | 33 | transmitter |
| 7 | flight light | 34 | switching cabinet |
| 8 | anemometer | 35 | rotor shaft |
| 9 | exit | 36 | transmission |
| 10 | adapter | 37 | generator |
| 10a | connecting element | 38 | rotor |
| 10b | adapter plate | 39 | hub |
| 10c | transition section | 40 | rotor blade |
| 11 | adhesive | 41 | machine support |
| 12 | layer | 50 | flange |
| 13 | top side X of the glass fiber | 51 | flange |
| | mat | 52 | threaded bolt |

-continued

List of reference signs

| | | | |
|---|---|---|---|
| 13a-b | layer | 53 | washer |
| 14 | threaded nut | 54 | nut |
| 15 | washer | 55 | connecting means |
| 16 | seal | 56 | carrier |
| 17 | conductor layer | 57 | end portion |
| 18 | mold cover | 58 | metal plate |
| 19 | recess | 59 | metal plate |
| 20 | junction | 60 | connecting means |
| 21 | threaded bolt | 61 | leaf spring |
| 22 | nut | 62 | flange |
| 23 | washer | 63 | adapter plate |
| 24 | metal plate | 64 | connecting element |
| 25 | metal plate | 65 | securing eyelets |

The invention claimed is:

1. Nacelle cover for a nacelle of a wind turbine having a tower and at least one rotor blade, wherein the nacelle is rotatably mounted on the tower, wherein the nacelle comprises a nacelle cover having at least an outer layer and an inner layer, and wherein a conductor layer for electromagnetic shielding of the nacelle is integrated into the nacelle cover, said nacelle cover comprising:

the conductor layer for electromagnetic shielding of the nacelle, which is arranged to be substantially completely integrated into the nacelle cover, in such a way that the conductor layer is protected from corrosion, and the life time of the conductor layer is increased, a conductor element, which is electrically connected to the conductor layer, wherein the conductor layer is directly or indirectly connected with at least one conductive structure, which can be arranged on an outer side or inner side of the nacelle cover, via the conductor element, and wherein the conductor layer and the conductor element are so configured and are so connected with each other and are so connectable with the at least one conductive structure, that via this a lightning current can be diverted from a structure mounted on the outer side of the nacelle cover and/or an electrical potential equalization between at least two of the at least one conductive structure arranged on the outer side or inner side of the nacelle cover is made possible, and an adapter, on which the conductor element is arranged in such a manner that the adapter has an electrically conductive connection cross-section with the conductor layer, said adapter comprising a connecting element for connecting the at least one conductive structure, and an adapter plate configured as the conductor element, which are respectively made of conductive material, and said connecting element is electrically conductively connected with the adapter plate and said adapter plate is electrically conductively connected with the conductor layer.

2. Nacelle cover according to claim 1, wherein the adapter plate is arranged between the outer layer and the inner layer, and the connecting element projects through the outer layer or the inner layer.

3. Nacelle cover for a nacelle of a wind turbine having a tower and at least one rotor blade, wherein the nacelle is rotatably mounted on the tower, wherein the nacelle comprises a nacelle cover having at least an outer layer and an inner layer, and wherein a conductor layer for electromagnetic shielding of the nacelle is integrated into the nacelle cover, said nacelle cover comprising:

the conductor layer for electromagnetic shielding of the nacelle, which is arranged to be substantially completely integrated into the nacelle cover, in such a way that the conductor layer is protected from corrosion, and the life time of the conductor layer is increased, a conductor element, which is electrically connected to the conductor layer, wherein the conductor layer is directly or indirectly connected with at least one conductive structure, which can be arranged on an outer side or inner side of the nacelle cover, via the conductor element, and wherein the conductor layer and the conductor element are so configured and are so connected with each other and are so connectable with the at least one conductive structure, that via this a lightning current can be diverted from a structure mounted on the outer side of the nacelle cover and/or an electrical potential equalization between at least two of the at least one conductive structure arranged on the outer side or inner side of the nacelle cover, is made possible, and wherein:

the conductor element is arranged at least partially between the outer layer and the inner layer and projects through the outer layer or the inner layer, and the adapter comprises a connecting element for connection of the at least one conductive structure and an adapter plate, which are respectively made of conductive material, the connecting element is electrically conductively connected with the adapter plate and the adapter plate is electrically conductively connected with the conductor element of the conductor layer, and the adapter plate is arranged on the outer side or on the inner side.

* * * * *